3,165,481
POLYMERIC ORGANOBORON COMPOUNDS

Robert J. Brotherton, Fullerton, Allen L. McCloskey, Orange, and Lowell L. Petterson, Whittier, Calif., assignors to United States Borax & Chemical Corporation, Los Angeles, Calif., a corporation of Nevada
No Drawing. Filed Mar. 20, 1962, Ser. No. 181,182
3 Claims. (Cl. 260—2)

The present invention relates as indicated to new polymeric organoboron compounds and has further reference to methods for preparing the same.

It is, therefore, the principal object of this invention to provide new thermally stable polymeric organoboron compounds.

It is a further object of the present invention to provide efficient means for preparing these thermally stable polymeric organoboron compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises organoboron polymers having the recurring structural unit

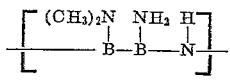

The present polymeric organoboron compounds have utility as molding and casting resins. These compounds are thermally stable at temperatures of over 500° C. On continued heating at higher temperatures, these polymers gradually release amine resulting in crosslinking and higher molecular weight materials. The present polymers additionally have utility as protective coatings for a variety of materials, such as, for example, different types of cloth and wire, which are to be subjected to high temperature environments.

The preparation of the polymeric organoboron compounds of the present invention can best be illustrated by following equation:

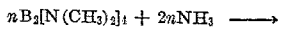

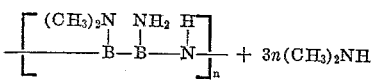

where $n$ is an integer greater than 1.

The above reaction can be performed in several different ways. One such method is to admix tetra(dimethylamino)diboron and excess liquid ammonia at a reduced temperature in a closed system. The reaction will then proceed under pressure as the admixture is heated to temperatures above about 40°. The excess ammonia and the dimethylamine reaction product are removed from the reaction mass, and the desired polymeric compound is recovered as the residue.

Another equally applicable method for preparing the present compounds is to slowly bubble substantially anhydrous ammonia through a solution of tetra(dimethylamino)diboron heated to temperatures of from about 80° C. to about 150° C. The dimethylamine reaction product and unreacted ammonia are continually removed from the reaction mass, and the desired polymeric compound is recovered as the residue.

So that the present invention can be more clearly understood, the following illustrative examples are given:

I. Liquid ammonia, 27.2 grams (1.60 mole), and 19.75 grams (0.10 mole) of tetra(dimethylamino)diboron were added to a glass bomb at about −30° C. The glass bomb was then sealed and placed in a rocking autoclave which was heated to about 50° C. About 20 atmospheres of pressure developed in the bomb which was kept in the autoclave at constant temperature for about 135 hours. The excess ammonia and dimethylamine were then removed from the autoclave and a solid, colorless polymeric product was recovered as the residue. Chemical analysis of the resultant polymer yielded the following data.

Calculated for $C_2H_9N_3B_2$: B=22.4%, N=43.4%. Found in product: B=22.8%, N=44.3%.

II. Tetra(dimethylamino)diboron, 13.95 grams (0.070 mole), was placed in a flask and heated to about 105° C. Substantially anhydrous ammonia was bubbled through the tetra(dimethylamino)diboron, and the unreacted ammonia and gaseous dimethylamine reaction product were collected continuously. After about 3 hours a solid, colorless material began to form and after about 92 hours the reaction was substantially complete. The flow of ammonia was halted, the flask was allowed to cool and the polymeric compound was recovered as the residue.

The products from the foregoing examples and other similar examples are solid, colorless, crystalline compounds with approximately the same elemental analysis. The thermal stability of these polymeric compounds was tested both in air and in sealed systems and when heated to about 500° C. they did not melt or show any visible change in appearance.

Other modes of applying the principle of the invention may be employed, change being made as regards the details described, provided the features stated in any of the following claims or the equivalent of such be employed.

We, therefore, particularly point out and distinctly claim as our invention:

1. Solid, thermally stable organoboron polymers consisting essentially of the recurring structural unit

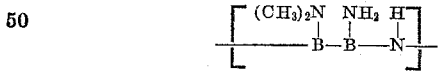

2. The method for preparing solid, thermally stable organoboron polymers consisting essentially of the recurring structural unit
organoboron polymers consisting essentially of the recurring structural unit

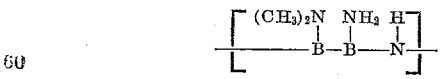

which comprises admixing tetra(dimethylamino)diboron and an excess of liquid ammonia at a reduced temperature, heating said mixture in a closed system to a temperature above about 40° C., removing the excess ammonia and the dimethylamine reaction product from the resultant reaction mass, and recovering said polymeric organoboron compound.

3. The method for preparing solid, thermally stable organoboron polymers consisting essentially of the recurring structural unit

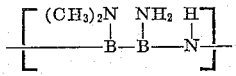

which comprises passing substantially anhydrous ammonia through a solution of tetra(dimethylamino)diboron heated to a temperature of from about 80° C to about 150° C., continuously removing any excess ammonia and dimethylamine reaction product from the reaction vessel and recovering said polymeric organoboron compound.

References Cited in the file of this patent
UNITED STATES PATENTS
3,068,182   English et al. _____ Dec. 11, 1962